United States Patent
Walacavage et al.

(10) Patent No.: US 6,442,441 B1
(45) Date of Patent: Aug. 27, 2002

(54) METHOD OF AUTOMATICALLY GENERATING AND VERIFYING PROGRAMMABLE LOGIC CONTROLLER CODE

(75) Inventors: J. G. Walacavage, Ypsilanti, MI (US); Alan Baumgartner, Leverkusen-Huescheid (DE); Scott Kennedy, Warren, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/312,499

(22) Filed: May 17, 1999

(51) Int. Cl.[7] .............................................. G06F 19/42
(52) U.S. Cl. ............................ 700/86; 700/18; 700/87; 700/97; 700/181; 717/104; 717/106; 717/114; 717/141; 341/20; 341/78; 341/86; 341/173
(58) Field of Search ....................... 700/86–88, 17–18, 700/97–98, 180, 181, 182, 100–114; 341/20–22, 86, 78, 173–176, 188; 717/104, 106, 108, 114–116, 136, 140, 141, 159

(56) References Cited

U.S. PATENT DOCUMENTS

| | | | |
|---|---|---|---|
| 4,928,221 A | 5/1990 | Belkhiter | 700/86 |
| 4,998,206 A | 3/1991 | Jones et al. | 700/96 |
| 5,249,135 A | 9/1993 | Fujita | 700/179 |
| 5,377,116 A | 12/1994 | Wayne et al. | 700/175 |
| 5,377,316 A | 12/1994 | Leggett | 345/440 |
| 5,388,051 A | 2/1995 | Seki et al. | 700/169 |
| 5,402,349 A | 3/1995 | Fujita et al. | 700/97 |
| 5,574,637 A | 11/1996 | Obata et al. | 700/2 |
| 5,644,493 A | 7/1997 | Motai et al. | 700/96 |
| 5,796,618 A | 8/1998 | Maeda et al. | 700/182 |
| 5,963,447 A | * 10/1999 | Kohn et al. | 700/49 |
| 6,167,406 A | * 12/2000 | Hoskins et al. | 707/102 |
| 6,223,134 B1 | * 4/2001 | Rust et al. | 702/121 |
| 6,263,487 B1 | * 7/2001 | Stripf et al. | 717/1 |

* cited by examiner

Primary Examiner—Ramesh Patel
(74) Attorney, Agent, or Firm—David B. Kelley

(57) ABSTRACT

A method of automatically generating and verifying programmable logic controller (PLC) code. The method includes the steps of constructing a neutral control model file, determining whether the neutral control model file is correct, generating PLC code if the neutral control model file is correct, verifying whether the PLC code is correct, and using the PLC code to build a tool.

29 Claims, 2 Drawing Sheets

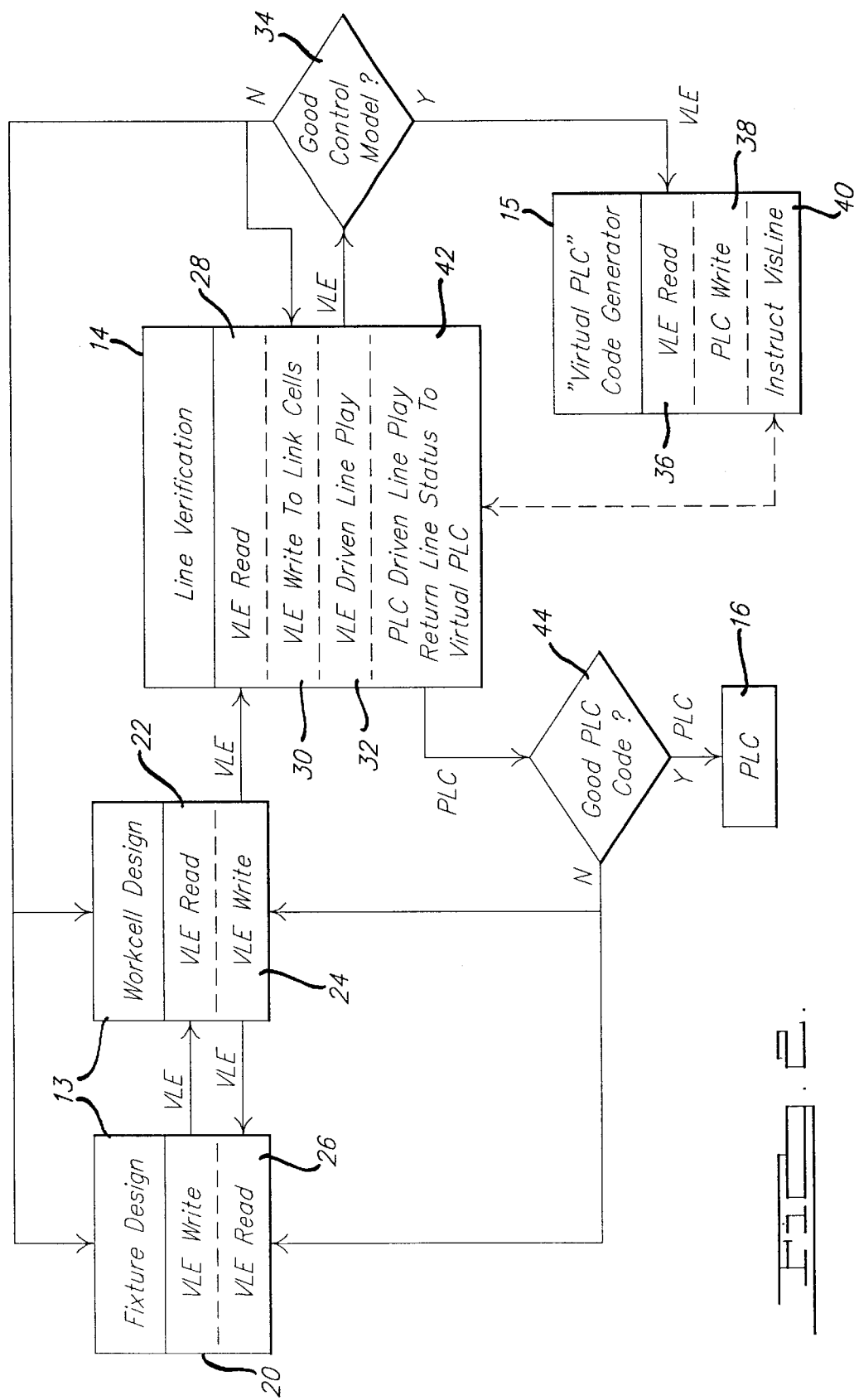

METHOD OF AUTOMATICALLY GENERATING AND VERIFYING PROGRAMMABLE LOGIC CONTROLLER CODE

BACKGROUND OF THE INVENTION

1. Field of the Invention

The present invention relates generally to programmable logic controllers and, more specifically, to a method of automatically generating and verifying programmable logic controller code.

2. Description of the Related Art

It is known that programmable logic controller code is written by controls engineers after assembly tooling designs are completed and the process has been defined. The programmable logic controller code is not validated (debugged) until the hard tools are built and tried. A significant portion of this tool tryout process is associated with the debugging of the programmable logic controller code at levels of detail from a tool by tool level, to a workcell level and finally at a tooling line level.

The creation of the programmable logic controller code is mostly a manual programming task with any automation of the code generation limited to "cutting and pasting", previously written blocks of code that were applied to similar manufacturing tools. Once the programmable logic controller code is written, it is used by the programmable logic controller to build subsequent hard tools used in the manufacture of parts for motor vehicles.

Although the above process has worked well, it is desirable to create the programmable logic controller code such that it can be tied directly with manufacturing process planning and the tool design process. It is also desirable to have a process with the ability to automatically generate and verify manufacturing programmable logic controller code. It is further desirable to provide a process that will enable generation and verification of programmable logic controller code analytically prior to hard tool build. Therefore, there is a need in the art to provide a method of automatically generating and verifying programmable logic controller code for a motor vehicle.

SUMMARY OF THE INVENTION

Accordingly, the present invention is a method of automatically generating and verifying programmable logic controller code. The method includes the steps of constructing a neutral control model file, determining whether the neutral control model file is correct and generating programmable logic controller (PLC) code if the neutral control model file is correct. The method also includes the steps of verifying whether the PLC code is correct and using the PLC code by a PLC to build a tool if the PLC code is correct.

One advantage of the present invention is that a method of automatically generating and verifying programmable logic controller code is provided for use in building tooling to manufacture parts of a motor vehicle. Another advantage of the present invention is that the method uses a neutral control model exchange format and development of a programmable logic controller code to simulate programmable logic controller operations. Yet another advantage of the present invention is that the method enables generation and verification of programmable logic controller code analytically prior to hard tool build. Still another advantage of the present invention is that the method eliminates the tool tryout process before the code is generated. A further advantage of the present invention is that the method improves manufacturing process cost and timing.

Other features and advantages of the present invention will be readily appreciated as the same becomes better understood after reading the subsequent description taken in conjunction with the accompanying drawings.

BRIEF DESCRIPTION OF THE DRAWINGS

FIG. 2 is a flowchart of a method, according to the present invention, of automatically generating and verifying programmable logic controller code of FIG. 1.

DESCRIPTION OF THE PREFERRED EMBODIMENT(S)

Figure 1:
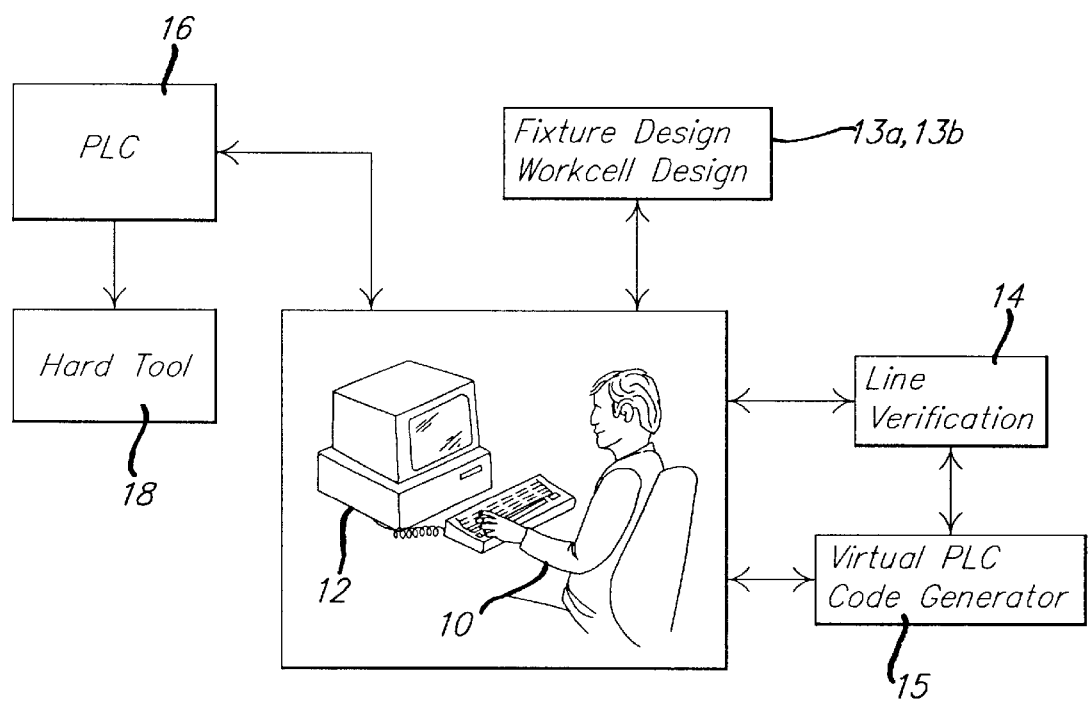
FIG. 1 is a diagrammatic view of a method, according to the present invention, of automatically generating and verifying programmable logic controller code illustrated in operational relationship with an operator.

Referring to the drawings and in particular FIG. 1, one embodiment of a method, according to the present invention, of automatically generating and verifying programmable logic controller (PLC) code is illustrated. In the present invention, the PLC code is automatically generated and verified by an operator 10 using a computer 12. The computer 12 sends and receives information from fixture design system 13a and workcell design system 13b via an electronic link. The fixture design system 13a and workcell design system 13b provide engineering data for standard components, tools, fixture models, and robots to interact with the fixture models. The computer 12 sends and receives information with a line verification system 14 via an electronic link. The line verification system 14 provides manufacturing data for a tooling line. The computer 12 also sends and receives information with a "virtual PLC" code generator 15 via an electronic link. The virtual PLC code generator 15 generates the PLC code. The virtual PLC code generator 15 sends and receives information with the line verification system 14 to verify the PLC code. Once the PLC code is analytically verified, it is exported by the computer 12 via an electronic link to at least one PLC 16. The PLC 16 is then used at physical tool build to produce or build a hard tool 18 which is used in a tooling line (not shown) for the manufacture of parts (not shown) for a motor vehicle (not shown). It should be appreciated that the computer 12, electronic links and PLC 16 are conventional and known in the art.

Referring to FIG. 2, a method, according to the present invention, of automatically generating and verifying PLC code for the PLC 16 is shown. In general, the method uses a neutral control model file, converts the neutral control model file into a compatible PLC code and analytically verifies the PLC code. It should be appreciated that the method is carried out on the computer 12 by the operator 10.

The neutral control model file is a neutral file that contains a definition of a "control model". In general, a model is typically some representation of critical elements of a real entity. As used herein, the neutral control model file is a representation of the critical elements required to control manufacturing tooling. This term "neutral" is meaningful in that the control file used in this process is not specific to any one PLC hardware platform nor is it specific to any one manufacturing tooling design or process planning system. The neutral control model file contains a description of interlocked events (sometimes referred to as networked event) which define the required dependencies, actions and signals that are associated with sequencing and cycling manufacturing tooling devices. For example, in constructing a vehicle body (not shown) of the motor vehicle, the control model would have individual events that described when the conditions were correct for a clamp to open or close. It should be appreciated that control model information from the neutral control model file can be readily passed from one manufacturing design system to another as long as all the tool design systems can interpret the neutral control model file format, in this embodiment, named VLE.

The method begins in block 20 by writing a neutral control model file for standard component, tool and fixture models by the fixture design system 13a. The fixture design system 13a has the ability to read and write in the VLE. For example, the fixture design system will create a neutral control model definition that describes how four clamps need to be sequenced along with a hard tooled welder. It should be appreciated that the control model is information that describes events, dependencies, and logical conditions that are used to drive line modeling software to be described.

From block 20, the method advances to block 22 and reads the neutral control model file from the fixture design system 13a by a workcell design system 13b. The workcell design system 13b has the ability to read and write in the VLE. The method then advances to block 24 and the workcell design system 13b writes to a neutral control model file for workcell models, incorporating information from the neutral control model file from the fixture design system 13a. For example, if a fixturing station has robots or flexible automation involved, the workcell design system 13b will import the fixture and processing data defined in the neutral control model file from the fixture design system 13a, allowing the user to add robots to interact with the fixture and clamps. It should be appreciated that several neutral control model files may be written by the workcell design system 13b.

From block 24, the method may advance to block 26 and the fixture design system 13a reads the edited neutral control model file from the workcell design system 13b if changes were made to the neutral control model file generated by the fixture design system 13a. Otherwise, the method advances to block 28 for line verification.

In block 28, the method reads and manages all the neutral control model files required to model a tooling line by the line verification system 14. The line verification system 14 has the ability to read in the VLE. The line verification system 14 also has the ability to manage large amounts of computer aided drafting (CAD) data. The line verification system 14 is predominately a collector of data and a viewing tool, not a creator of data. The line verification system 14 reads neutral control model files from the fixture design system 13a and workcell design system 13b.

From block 28, the method advances to block 30 and writes a neutral control model file by the line verification system to "logically link" the fixtures of the fixture design system 13a and the workcells of the workcell design system 13b into a tooling line. The line verification system 14 has the ability to write in VLE that enables logical linking the neutral control model files created from multiple design tools. The method then advances to block 32 and plays a line model by the line verification system 14, which is driven by the control model described within the neutral control model files.

After block 32, the method then advances to diamond 34 and determines whether a good control model exists by the operator 10. If the control model is not correct, the method returns to the source of engineering data such as the fixture design system 13a and/or workcell design system 13b to adjust the fixture/workcell description by the fixture design system 13a and workcell design system 13b. If the control model is not correct because of an error in the line control of the line verification system 14, the method returns to block 30 previously described.

In diamond 34, if the control model is good or correct, the method advances to block 36 and reads the neutral control model files by a "virtual programmable logic controller" code generator 15. The method advances to block 38 and automatically generates the PLC code with the virtual PLC code generator 15 from the neutral control model files. The virtual PLC code generator 15 will create PLC code (with diagnostics) from a VLE. As previously described, the control model will only contain information that is critical to describing how the tooling should operate "as designed" or "as expected" conditions, sometimes referred to as straight sequence cycling. It should be appreciated that typically only fifteen percent (15%) to thirty percent (30%) of the PLC code is associated with the straight sequence control of equipment and the remainder of the PLC code is to provide diagnostic and human machine interface information to operators when the equipment gets into non-normal or non-expected states. It should also be appreciated that the virtual PLC 15 will also create as much of the non-straight sequence code that is practical. It should be further appreciated that at this point in the process the PLC code becomes specific to the PLC that will be used to control the physical tools due to the unique micro-processors programming requirements that are directly dependent on the type of PLC.

From block 40, the method then advances to block 42 and instructs the line verification system 14 by the virtual PLC generator 15 based on the PLC code. The method advances to block 42 and plays a line model by the line verification system 14, which is driven by the PLC code generated by the virtual PLC generator 15 to analytically verify the PLC code. The validation is performed by having the virtual PLC generator 15 instruct CAD tooling models associated with the creation of the control model that the virtual PLC generator 15 read in. While executing the line model, the line verification system 14 returns line status data (device state changes) to the virtual PLC generator 15. The virtual PLC generator 15 receives back signals from the CAD tooling models that inform the virtual PLC generator 15 of a state change with a particular device. The virtual PLC generator 15 then takes this "input" signal and adjusts its input image tale, and rescans the PLC code to determine if this signal change has allowed a dependency to be met that will produce an "output" instruction from the virtual PLC generator 15 back to the CAD tooling models. It should be appreciated that this cycle represents in an analytical environment what really takes place between the physical tools and PLC. It should be appreciated that the "handshake" between the line verification system 14 and virtual PLC generator 15 allows for the testing of the actual PLC code, including the diagnostic and human machine interface portion of the PLC code.

After block 42, the method advances to diamond 44 and determines whether the PLC code is good. For example, if a tooling model activity is interrupted or halted while in this PLC analytical verification mode, forcing a tooling model of a clamp to remain in the down position and introducing a non-normal condition, the virtual PLC code generator 16 will have the ability to present diagnostic information that will indicate the potential source(s) of the failed condition. If not or errors are detected in the PLC code execution, the method returns to source of engineering data which is the fixture design system 13a or the workcell design system 13b.

If the PLC code is good or correct, the method advances to block 16 and the PLC uses the PLC code at tool build. The method then ends.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of automatically generating and verifying programmable logic controller (PLC) code, said method comprising the steps of:
   constructing a neutral control model file;
   determining whether the neutral control model file is correct;
   generating PLC code by a virtual programmable logic controller code generator if the neutral control model file is correct;
   verifying whether the PLC code is correct; and
   using the PLC code to build a tool if the PLC code is correct.

2. A method as set forth in claim 1 wherein said step of constructing comprises writing a first neutral control model file by a fixture design system for a fixture design.

3. A method as set forth in claim 2 wherein said step of constructing further comprises reading the first neutral control model file by a workcell design system.

4. A method as set forth in claim 3 wherein said step of constructing further comprises writing a second neutral control model file for a workcell design by the workcell design system.

5. A method as set forth in claim 4 wherein said step of constructing further comprises reading the second neutral control model file by the fixture design system.

6. A method as set forth in claim 4 wherein said step of constructing further comprises reading the second neutral control model file by a line verification system.

7. A method as set forth in claim 6 wherein said step of constructing further comprises writing the neutral control model file to link the first neutral control model file and the second neutral control model file.

8. A method as set forth in claim 6 wherein said step of constructing further comprises playing a line model by the line verification system based on the neutral control model file.

9. A method as set forth in claim 8 including the step of returning to either one of the fixture design system or the workcell design system if the neutral control model file is not correct.

10. A method as set forth in claim 8 including the step of returning to write the third neutral control model file if the neutral control model file is not correct.

11. A method as set forth in claim 1 wherein said step of generating comprises reading the neutral control model file if the neutral control model file is correct.

12. A method as set forth in claim 11 wherein said step of generating comprises automatically generating PLC code from the neutral control model file.

13. A method as set forth in claim 1 wherein said step of verifying comprises playing a line model by a line verification system based on the PLC code.

14. A method as set forth in claim 1 including the step of returning to either one of the fixture design system and workcell design system if the PLC code is not correct.

15. A method of automatically generating and verifying programmable logic controller (PLC) code, said method comprising the steps of:
   writing a first neutral control model file by a fixture design system for a fixture design;
   writing a second neutral control model file for a workcell design by a workcell design system;
   writing a neutral control model file to link the first neutral control model file and the second neutral control model file;
   determining whether the neutral control model file is correct;
   generating PLC code by a virtual programmable logic controller code generator if the neutral control model file is correct;
   verifying whether the PLC code is correct; and
   using the PLC code to build a tool if the PLC code is correct.

16. A method as set forth in claim 15 including the step of playing a line model by the line verification system based on the neutral control model file.

17. A method as set forth in claim 16 wherein said step of generating comprises automatically generating PLC code from the neutral control model file.

18. A method as set forth in claim 15 including the step of returning to either one of the fixture design system or the workcell design system if the neutral control model file is not correct.

19. A method as set forth in claim 15 wherein said step of generating comprises reading the neutral control model file if the neutral control model file is correct.

20. A method for automatically generating and verifying programmable logic controller (PLC) code, said method comprising the steps of:
   writing a first neutral control model file by a fixture design system for a fixture design;
   writing a second neutral control model file for a workcell design by a workcell design system;
   writing a neutral control model file to link the first neutral control model file and the second neutral control model file;
   determining whether the neutral control model file is correct;
   returning to either one of the fixture design system or the workcell design system if the neutral control model file is not correct;
   reading the neutral control model file by a virtual programmable logic controller code generator if the neutral control model file is correct and automatically generating PLC code by the virtual programmable logic controller code generator from the neutral control model file if the neutral control model file is correct;
   verifying whether the PLC code is correct; and
   using the PLC code to build a tool.

21. A method of automatically generating and verifying programmable logic controller (PLC) code for a tooling line, said method comprising the steps of:
   constructing a neutral control model file;
   reading the neutral control model file by a tooling line verification system;
   writing a tooling line control model based on the neutral control model file with the tooling line verification system;
   playing the tooling line control model by the tooling line verification system;

determining whether the tooling line control model is correct; and generating PLC code by a virtual programmable logic controller code generator if the tooling line control model is correct.

22. A method as set forth in claim 21 including the step of verifying whether the PLC code is correct by the line verification system.

23. A method as set forth in claim 22 including the step of determining whether the PLC code is correct.

24. A method as set forth in claim 23 including the step of using the PLC code to build a tooling line if the PLC code is correct.

25. A method as set forth in claim 22 including the step of returning to either one of a fixture design system and workcell design system if the PLC code is not correct.

26. A method as set forth in claim 21 wherein said step of constructing comprises writing a first neutral control model file by a fixture design system for a fixture design.

27. A method as set forth in claim 26 wherein said step of constructing further comprises writing a second neutral control model file by a workcell design system.

28. A method as set forth in claim 27 wherein said step of writing further comprises writing the tooling line control model to link the first neutral control model file and the second neutral control model file.

29. A method for automatically generating and verifying programmable logic controller (PLC) code for a tooling line, said method comprising the steps of:

writing a first neutral control model file by a fixture design system for a fixture design;

writing a second neutral control model file for a workcell design by a workcell design system;

reading the first neutral control model file and the second neutral control model file by a tooling line verification system;

writing a tooling line control model to link the first neutral control model file and the second neutral control model file by the tooling line verification system;

playing the tooling line control model by the line verification system;

determining whether the tooling line control model is correct;

returning to either one of the fixture design system or the workcell design system if the tooling line control model is not correct;

reading the tooling line control model by a virtual programmable logic controller code generator if the tooling line control model is correct and automatically generating PLC code by the virtual programmable logic controller code generator from the tooling line control model file;

verifying whether the PLC code is correct by the line verification system;

determining whether the PLC code is correct;

returning to either one of a fixture design system and workcell design system if the PLC code is not correct; and using the PLC code to build a tooling line if the PLC code is correct.

* * * * *